United States Patent [19]

Taylor et al.

[11] 4,030,123

[45] June 14, 1977

[54] STYLUS ADJUSTMENT APPARATUS FOR A VIDEO DISC PLAYER

[75] Inventors: Byron Kent Taylor, Indianapolis; James Austin Allen, Monrovia, both of Ind.

[73] Assignee: RCA Corporation, New York, N.Y.

[22] Filed: Mar. 16, 1976

[21] Appl. No.: 667,396

[30] Foreign Application Priority Data

Sept. 18, 1975 United Kingdom ............ 38458/75
Nov. 28, 1975 United Kingdom ............ 49107/75

[52] U.S. Cl. .................... 358/128; 179/100.4 R; 179/100.41 R; 274/37
[51] Int. Cl.² ............................................ H04N 5/76
[58] Field of Search .............. 178/6.6 R, 6.6 DD; 179/100.4 R, 100.41 R, 100.41 S, 100.41 G; 274/37–38, 23

[56] References Cited

UNITED STATES PATENTS

| | | | |
|---|---|---|---|
| 2,965,378 | 12/1960 | Assie | 274/37 |
| 3,952,145 | 4/1976 | Allen | 179/100.41 G X |
| 3,952,147 | 4/1976 | Leedom | 178/6.6 R |
| 3,961,131 | 6/1976 | Taylor | 178/6.6 R |

FOREIGN PATENTS OR APPLICATIONS 1,160,662  1/1964  Germany .................... 274/23

Primary Examiner—Bernard Konick
Assistant Examiner—John H. Wolff
Attorney, Agent, or Firm—Eugene M. Whitacre; William H. Meagher; Dilip A. Kulkarni

[57] ABSTRACT

A system for playing back prerecorded signals from a spirally-grooved and rotatable record includes a carriage mounted for lateral motion relative to a motorboard of the system in correlation with lateral motion of a groove-riding stylus during playback. A stylus arm cartridge, enclosing a stylus arm supporting a stylus at one end thereof, is subject to reception in a compartment provided in the carriage. The second end of the stylus arm is pivoted in the cartridge. A first end of a leaf spring, provided for urging the stylus into the record groove during playback, is secured to the stylus. A second end of the leaf spring is secured to a ball which is friction loaded into a socket provided in the cartridge. Adjustment of angular orientation of the ball in the socket provides control of the stylus/record tracking pressure, and the lateral position of the stylus arm in the cartridge.

9 Claims, 8 Drawing Figures

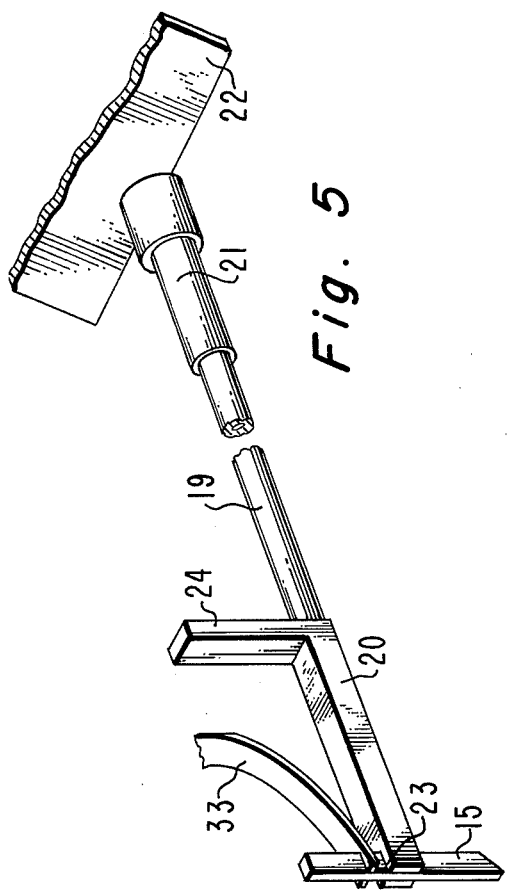
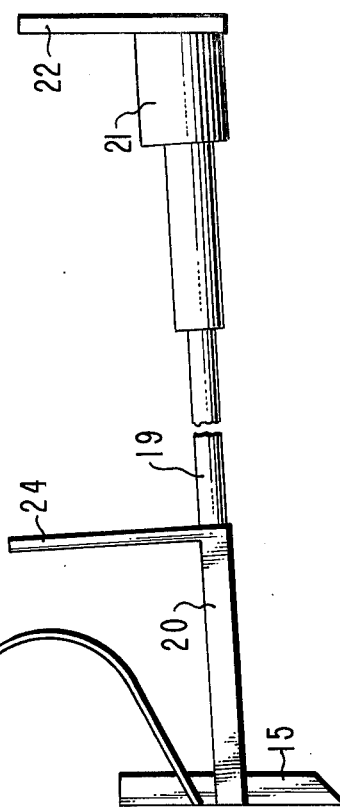
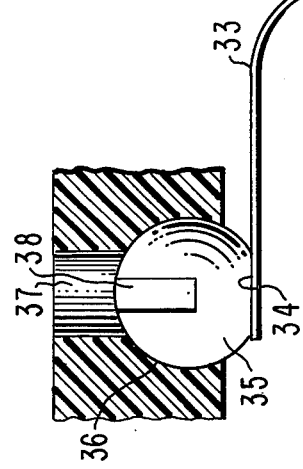
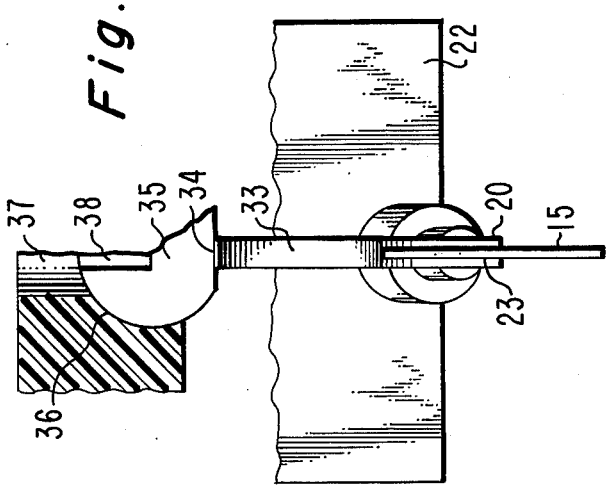
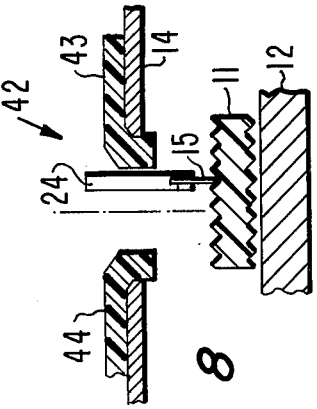

STYLUS ADJUSTMENT APPARATUS FOR A VIDEO DISC PLAYER

The present invention relates generally to a video disc player, and, more particularly, to stylus adjustment apparatus for a video disc player.

A video disc system of the type described in the U.S. Pat. No. 3,842,194, issued to Jon K. Clemens, generally utilizes records having groove densities of the order of four to eight thousand groove convolutions per inch. A typical video record of this type may have a grove convolution spacing of the order 3.5 microns. The fragile walls of relatively narrow record grooves cannot be dependably relied upon to pull a stylus arm unit, around the compliant member, across the entire recorded surface of the record. Also, in video disc systems of the type described in the abovementioned patent, it is desirable for accurate reproduction of the prerecorded signals that the stylus (and an electrode formed thereon) maintain a substantially constant attitude in the record groove during playback. Therefore, a lateral feed drive mechanism is provided for traversing a carriage supporting the stylus arm unit, in proper time relationship with the lateral motion of the stylus due to the spiral groove, so as to continuously maintain the longitudinal axis of the stylus arm substantially tangential to the spiral groove at the point of stylus/groove engagement during playback. U.S. Pat. No. 3,870,835, issued on Mar. 11, 1975 to Frederick R. Stave, illustrates such a lateral feed drive mechanism.

The stylus needs a certain tracking force to assure proper tracking and seating of the stylus in the record groove during playback. All of the tracking force may come from the weight of the stylus arm unit, whereby the tracking is, essentially, mass controlled along the record groove and up-and-down on any defect in the record groove. However, as disclosed in the copending U.S. patent application Ser. No. 662,307 of A.R. Dholakia, entitled "VIDEO DISC PLAYER EMPLOYING A SPRING LOADED STYLUS APPARATUS", and filed concurrently herewith and assignee of the instant application, it is preferable to employ a stylus arm having a mass lower than that required for desirable tracking force, and to provide a spring connected between the stylus and the carriage to impart the desired tracking force. It has been found that such an arrangement substantially reduces the duration of signal dropouts during playback, because the leaf spring causes the stylus to quickly return to the record groove when the stylus is deflected away from the surface of the record by a defect in the record groove. The stylus spring may additionally serve to establish electrical connection between an electrode on the stylus and signal processing circuitry of the player.

It is herein recognized that additional advantage may be taken of the presence of the stylus-connected spring in the aforementioned spring-loaded stylus arrangement to provide a facility for adjustable control of the lateral positioning of the stylus arm as well as adjustable control of the stylus tracking force. Pursuant to the principles of the present invention, such a facility is obtained by associating the stylus-connected spring with a structure for adjusting the location of the spring end remote from the stylus.

In accordance with an illustrative embodiment of the present invention, the location adjusting structure takes the form of a ball friction-loaded in a socket, with a surface of the ball projecting from the socket and secured to the end of the spring remote from the stylus. Rotation of the ball about a first axis substantially perpendicular to the stylus arm provides adjustment of the tracking force imparted to the stylus by the spring, while rotation of the ball about a second axis orthogonal to the first axis provides adjustment of the lateral positioning of the stylus arm. The latter adjustment permits, for example, accurate location of the stylus arm relative to an abutment in an associated housing, whereby rapid escape of the stylus from a "locked groove" playback condition may be assured.

FIG. 1 illustrates a portion of video disc player, under "play" conditions, the player employing a stylus arm cartridge embodying the present invention;

FIG. 5 is a perspective view of the stylus arm unit which is enclosed within the stylus arm cartridge of FIGS. 1–4;

FIGS. 6 and 7 are, respectively, a side view and a front view of the stylus arm unit of FIG. 5; and FIG. 8 illustrates player structure associated with the stylus arm unit of FIGS. 5–7 for locked groove escape purposes.

Figure 1:
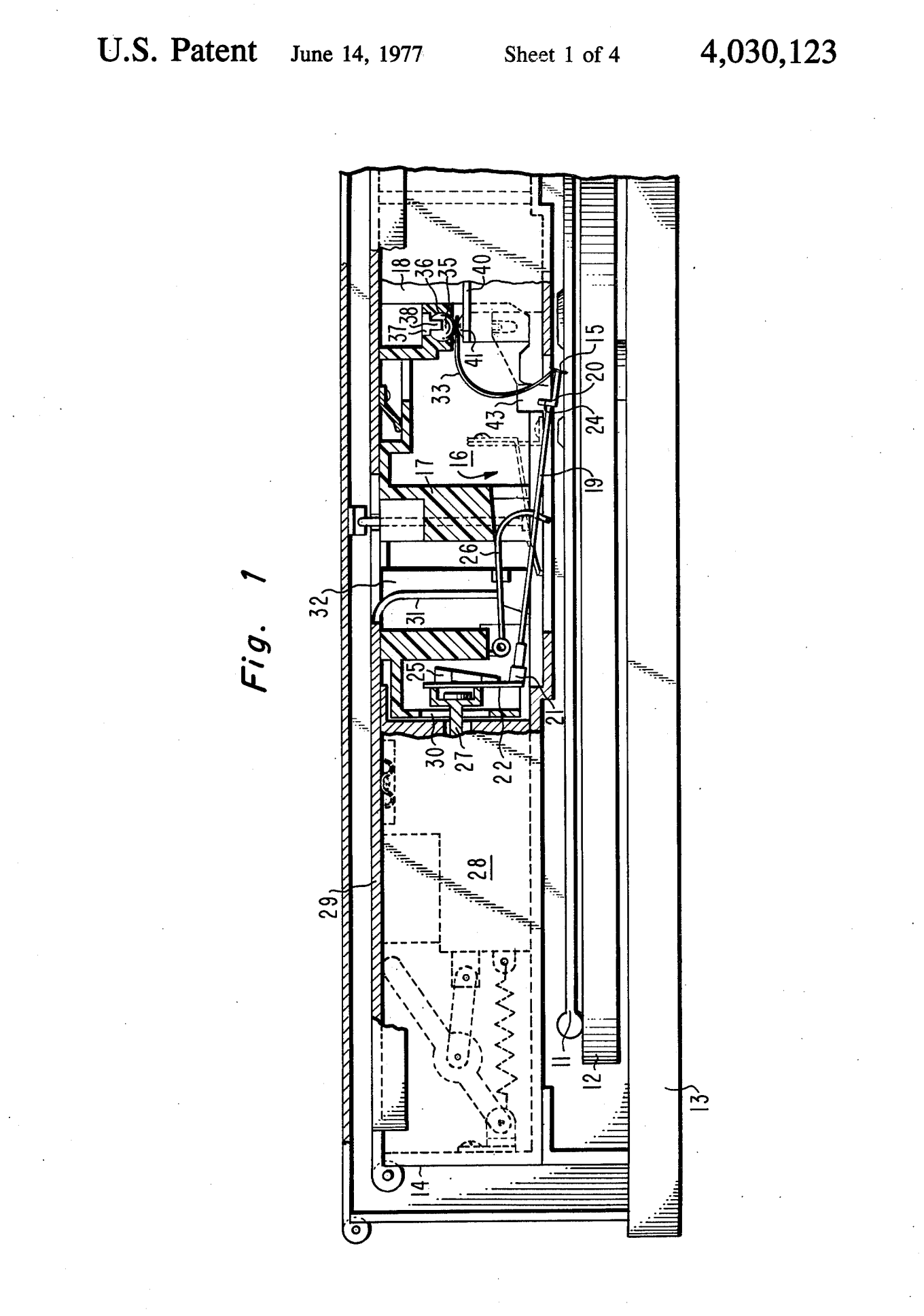
Figure 2:
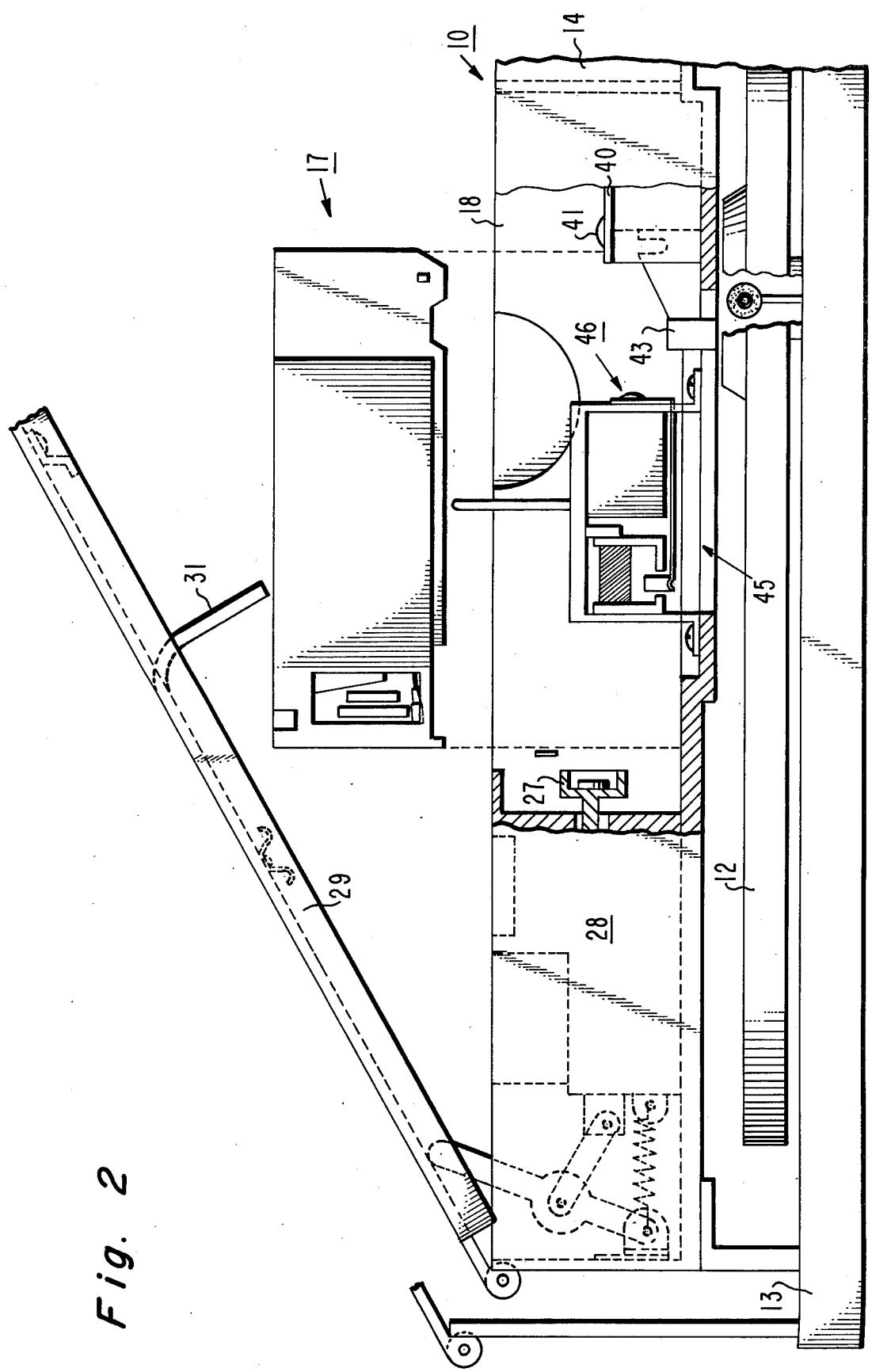
FIG. 2 illustrates the video disc player of FIG. 1 under non-playing condition, with the stylus arm cartridge undergoing removal from the player.

In FIG. 1, numeral 10 indicates a video disc player of the general type shown in the U.S. Pat. No. 3,842,194 (Clemens). A record 11 is rotatably mounted for playback on a turntable 12 secured to a motorboard 13 of the player. A carriage 14 is mounted for lateral motion relative to the motorboard 13 in correlation with, but independent of, the lateral motion of the stylus 15 riding in a spiral groove disposed on the surface of the record 11 during playback. Reference may be made to the U.S. Pat. No. 3,870,835 (Stave) for illustration of an apparatus for laterally driving the carriage 14 during playback.

A stylus arm unit 16 is housed in the stylus arm cartridge 17. In FIG. 2, the cartridge 17 is shown outside the player 10 to illustrate, separately, the details of the cartridge 17 and the carriage 14. The cartridge 17 (which is illustratively of a form described in detail in the copending application Ser. No. 667,420 of J.K. Allen, entitled "VIDEO DISC PLAYBACK SYSTEMS AND PICKUP CARTRIDGE THEREFOR", and filed concurrently herewith and assigned to the assignee of the instant application) is subject to reception in a compartment 18 provided in the carriage 14.

Figure 4:
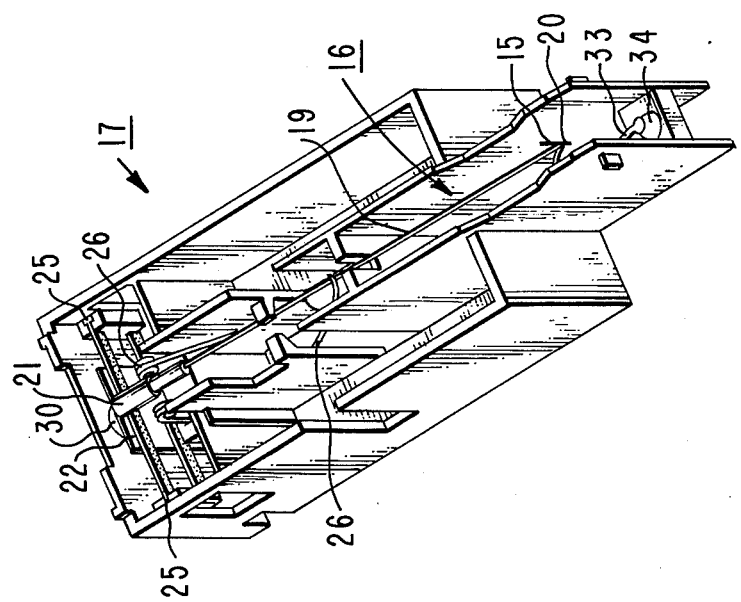
FIGS. 3 and 4 are top and bottom perspective views of the stylus arm cartridge of FIGS. 1 and 2.
Figure 3:
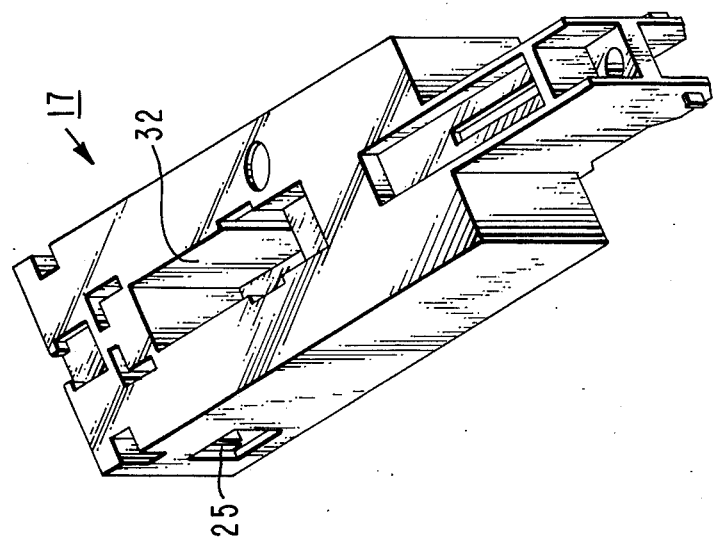

FIGS. 3 and 4 illustrate, respectively, the top and bottom perspective view of the cartridge 17. The details of installation of the stylus arm unit 16 in the cartridge 17 are shown more clearly in FIG. 4.

As can be seen from FIG. 5, the stylus arm unit 16 comprises a stylus arm 19 formed as a tube (e.g., formed of aluminum tubing having a 0.024 inch outer diameter and 0.002 inch thickness) with a plastic stylus holder 20 insert molded at one end of the stylus arm and a complaint member 21 insert molded at the other end of the stylus arm. The complaint member 21 is in a substantially unstressed condition when the stylus arm 19 is aligned therewith. A connector plate 22 is glues to the complaint member 21 in a manner that establishes a 94° angle therebetween. The plastic stylus holder 20 contains a slot 23 in which the stylus 15 is glued in place. An upwardly projecting deflector 24 is molded at the top of the plastic stylus holder 20. The deflector 24 is subject to engagement with an abutment 43, extending into the bottom opening 45 of carriage 14, to relieve the stylus 15 from the locking groove in a record 11, as explained in the copending application Ser. No. 667,308 of M.A. Leedom, entitled "PICKUP CARTRIDGE" and concurrently filed herewith assigned to the assignee of the instant application, and as considered herein in greater detail subsequently.

The stylus arm unit 16 is suspended in the cartridge 17 by an elastic diaphragm 25 as shown in FIG. 4. A U-shaped spring 26 releasably clamps the stylus carrying end of the stylus arm 19 in a retracted position in the cartridge 17 during storage and handling of the cartridge (i.e., while the cartridge is outside the player compartment 18). The retracted position provides a location for the stylus 15 withdrawn within the confines of the cartridge 17, remote from an opening in the bottom wall of the cartridge through which the stylus may protrude (e.g., during playback).

As can be seen from FIGS. 1 and 2, a support member 27 of an armstretcher apparatus 28 rigidly engages the connector plate 22 during containment of the cartridge 17 in a player compartment 18. The armstretcher 28 (serving a velocity error correcting function, as disclosed in U.S. Pat. No. 2,711,641 — Palmer) is slidably mounted in the player compartment 18 for movement between withdrawn position (when a lid 29 of the carriage 14 is open) to an advanced position (when the carriage lid 29 is closed) in response to the motion of the carriage lid 29. The support member 27 enters the interior of the cartridge 17 through an opening 30 (FIG. 4) in the cartridge to engage the connector plate 22 when the armstretcher 28 is advanced.

A spring defeat lever 31, secured to the carriage lid 29, enters the interior of the cartridge 17 through an opening 32 in the cartridge to defeat the clamping spring 26, during containment of the cartridge in the player compartment 18, upon closure of the carriage lid 29. Upon such defeat of the clamping spring 26, the elevation of the arm 19 becomes subject to the control of a stylus lifting/lowering mechanism 46, which is illustratively of the form disclosed in the copending U.S. patent application Ser. No. 667,309 J. Bleazey, et al., entitled "STYLUS ARM LIFTING/ LOWERING APPARATUS FOR A VIDEO DISC PLAYER," and filed concurrently herewith and assigned his the assignee of the instant application. The mechanism 16 is mounted in the carriage 14 (as best shown in FIG. 2) and serves to move the arm 19 between an elevated position, in which the stylus 15 is retracted within the carriage 14 to a degree precluding stylus/record contact, and depressed position, in which the arm unit protrudes through the carriage bottom opening 45 to a degree permitting stylus reception in a record groove (as shown in FIG. 1).

The cartridge 17 further includes a leaf spring 33, in the form of a ribbon, for urging the stylus 15 in the record groove during playback, as shown in FIG. 1 and explained in the aformentioned Dholakia application. A first end of the leaf spring 33 is secured to the stylus 15 as shown in FIGS. 1, 5 and 6.

For the stylus adjustment purposes of the present invention, the second end of the leaf spring 33 is secured to a flat 34 on a portion of a ball 35, as shown in FIGS. 1, 4, 6 and 7. The ball 35 is friction loaded into a socket 36 provided in the cartridge 17 so that the flat 34 protrudes from the socket. The cartridge 17 has an access opening 37 in communication with the top of socket 36, through which opening a tool may be inserted to engage a (e.g., hex-shaped) hole 38 provided in the ball 35, for the purpose of adjustment of the stylus 15.

As explained in the aformentioned Dholakia application, the spring 33, formed of conductive material, additionally serves the purpose of providing an electrical connection to an electrode formed on the stylus 15. Pursuant to this purpose, a contact 41 is provided on a signal processing circuit board 40, mounted in carriage 14, and located in a position to contact the second end of spring 33, when the cartridge 17 is loaded in compartment 18 and carriage lid 29 is closed.

Rotation of ball 35 in socket 36, about a lateral axis substantially orthogonal to the longitudinal axis of arm 19, in a clockwise direction as shown in FIG. 6 (counterclockwise, for the view of FIG. 1) alters the spring orientation in a manner increasing the downward force on stylus 15 (to provide increased tracking pressure on a record groove botton, during playback). The securing means for the second end of spring 33 thus provides a convenient facility for stylus tracking force adjustment.

Rotation of ball 35 in socket 36 about a lateral axis substantially parallel to the longitudinal axis of arm 19 alters the later position of the stylus 15 to control the lateral orientation of arm 19 in cartridge 17, and hence, the lateral orientation of arm 19 in carriage 14 when the cartridge 17 is in place therein. When the proper lateral orientation of arm 19 is established, the arm 19 will be in a position permitting stylus passage through registered bottom openings in the cartridge 17 and carriage 14 to establish record contact for playback purposes.

However, as will now be explained with the aid of the showing of FIG. 8, the precise lateral orientation of the arm 19 is desirably set by the rotational adjustment of ball 35 to offset the stylus holder projection 24 from the center of a narrowed portion of the carriage opening bottom 45. The narrowed portion is defined by a channel 42 formed between two spaced abutments 43 and 44, shown in cross-section in FIG. 8; the channel 42 is occupied by the upwardly projecting member 24 when the stylus 15 is received in a record groove. The desired direction of off-centering is in the direction of the outermost abutment 43 (i.e., the abutment most remote from the center of record rotation). With the member 24 of an elevated arm unit thus aligned with the outer region of channel 42, one is assured that a lowering of stylus 15 into the record groove will place member 24 in close proximity to the outer abutment 43.

Such close proximity to the outer abutment 43 is desired to ensure rapid escape of stylus 15 from a locked groove. That is, if normal progression of the stylus 15 toward the innermost convolution of a record's spiral groove is interrupted by an encounter with a locked groove, the closely proximate abutment 43, advancing toward the center of turntable with the lateral movement of carriage 14, will quickly engage member 24 and force stylus 15 inward, to effect its escape from the locked groove region. By shifting the center of member 24 (of an illustrative width of 0.003 inches) outward from the center of a channel (of an illustrative width of 0.050 inches) by a distance of approximately 0.010 inches, one may shorten the time between locked groove encounter and locked groove escape sufficiently to render the locked groove condition occurrence essentially unnoticeable to a viewer of the played back images. In contrast, with a centered location of the member 24, the time between locked groove encounter and locked groove escape may be as long as seven seconds, for example, with annoying consequences to the viewer.

When the desired rotational adjustments of ball 35 have been made, for the above-desired purposes, maintenance of the resultant angular orientation of the ball may be ensured, for example, by gluing the ball 35 in place.

What is claimed is:

1. In a system for playing back prerecorded signals from a spirally-grooved and rotatable record, said system including a carriage mounted for lateral motion relative to a base plate of said system in correlation with lateral motion of a groove-riding stylus during playback; an apparatus comprising:
  A. a stylus arm carrying said stylus at one end thereof;
  B. means for flexibly supporting the end of said stylus arm remote from said one end within said carriage;
  C. a spring for urging said stylus into said record groove during playback; said spring having a first end and a second end; said first end of said spring being secured to said stylus; and
  D. means mounted within said carriage and secured to said second end of said spring for adjusting the location of said second end of said spring.

2. Apparatus in accordance with claim 1 wherein said location adjusting means comprises means for rotating said second end of said spring about a first axis substantially parallel to the longitudinal axis of said stylus arm.

3. Apparatus in accordance with claim 2 wherein said spring end rotating means additionally permits rotation of said second end of said spring about a second axis orthogonal to said first axis.

4. Apparatus in accordance with claim 2 wherein said carriage is provided with a bottom opening; wherein at least a portion of said bottom opening is defined by a channel formed between a pair of spaced abutments; wherein said apparatus includes means for moving said stylus arm between an elevated position, providing retraction of said stylus within said carriage to preclude stylus/record contact, and a depressed position, permitting protrusion of said stylus arm through said opening to permit stylus reception in a record groove for playback purposes; wherein said apparatus also includes a projecting member secured to said stylus arm and subject to occupancy of said channel during stylus reception in a record groove; and wherein the rotational orientation of said second end of said spring about said first axis is such as to establish an off-centered alignment between said projecting member and said channel when said stylus arm is in said elevated position.

5. Apparatus in accordance with claim 4, for use in playing back prerecorded video signals also including a turntable for rotatably supporting said record during playback; wherein one of said pair of abutments is more remote from the center of said turntable than the other; and wherein said off-centered alignment displaces said projecting manner away from the center of said channel in the direction of said one of said pair of abutments.

6. In a system for playing back prerecorded signals from a spirally-grooved and rotatable record; said system including a carriage mounted for lateral motion relative to a base plate of said system in correlation with lateral motion of a groove-riding stylus during playback; an apparatus comprising:
  A. a stylus arm carrying said stylus at one end thereof;
  B. means for flexibly supporting the end of said stylus arm remote from said one end within said carriage;
  C. a leaf spring for urging said stylus into said record groove during playback; said spring having a first end and a second end; said first end of said spring being secured to said stylus; and
  D. means for adjusting the stylus tracking force, said adjusting means comprising means mounted within said carriage and secured to said second end of said spring for adjustably rotating said second end of said spring about an axis substantially orthogonal to the longitudinal axis of said stylus arm.

7. Apparatus in accordance with claim 6 wherein spring end rotating means also permits rotation of said second end of said spring about an axis substantially parallel to the longitudinal axis of said stylus arm for control of the lateral positioning of said arm in said carriage.

8. In a system for playing back prerecorded signals for a sprially-grooved and rotatable record; said system including a carriage mounted for lateral motion relative to a base plate of said system in correlation with lateral motion of a groove-riding stylus during playback; an apparatus comprising;
  A. a stylus arm carrying said stylus at one end thereof;
  B. means for flexibly supporting the end of said stylus arm remote from said one end within said carriage;
  C. a leaf spring for urging said stylus into said record groove during playback; said spring having a first end and a second end; said first end of said spring being secured to said stylus; and
  D. means for adjusting the lateral orientation of said stylus arm in said carriage, said adjusting means comprising means mounted within said carriage and secured to said second end of said spring for adjustably rotating said second end of said spring about an axis substantially parallel to the longitudinal axis of said stylus arm.

9. A pickup carriage, for use in a system for playing back prerecorded signals from a grooved record; said cartridge comprising:
  A. a stylus;
  B. a stylus arm carrying said stylus at one end thereof;
  C. a body having walls defining a protective enclosure for said stylus and said stylus arm;
  D. means for pivotally supporting the end of said stylus arm remote from said one end within said body;
  E. a leaf spring having a first end and a second end; said first end of said spring being secured to said stylus; and
  F. means for securing said second end of said spring within said cartridge body above said stylus; said securing means comprising:
    a. a socket provided in said cartridge body;
    b. an access opening provided in said boy communicating with said socket; and
    c. a ball friction-loaded in said socket; said ball having a first portion which is accessible via said access opening; said ball having a second portion located opposite said first portion; said second portion of said ball protruding beyond said socket; and said second end of said spring being secured to said second portion so as to permit adjustment of the location of said second end of said spring with respect to said carriage body by manipulation of said first portion of said ball through said access opening.

* * * * *

UNITED STATES PATENT OFFICE
CERTIFICATE OF CORRECTION

PATENT NO. : 4,030,123
DATED : June 14, 1977
INVENTOR(S) : James A. Allen, et al.

It is certified that error appears in the above-identified patent and that said Letters Patent are hereby corrected as shown below:

Column 1, Line 12 - change "grove" to -- groove --

Column 2, Line 46 - change "J. K. Allen" to -- J. A. Allen --

Column 2, line 64 - change "glues" to -- glued --

Column 4, line 63 - change "0.003" to -- .030 --

Column 5, line 60 - change "manner" to -- member --

Column 6, line 40 - change "carriage" to -- cartridge --

Column 6, line 56 - change "boy" to -- body --

Column 6, line 65 - change "carriage" to -- cartridge --

Signed and Sealed this

Eighteenth Day of April 1978

[SEAL]

Attest:

RUTH C. MASON
Attesting Officer

LUTRELLE F. PARKER
Acting Commissioner of Patents and Trademarks